United States Patent [19]
Klingenberger

[11] Patent Number: 5,804,080
[45] Date of Patent: Sep. 8, 1998

[54] COMPUTER CONTROLLED METHOD OF OPERATING A SWIMMING POOL FILTRATION SYSTEM

[76] Inventor: Bodo Klingenberger, Langer Stieg 66, D-38855 Wernigerode, Germany

[21] Appl. No.: 727,938

[22] Filed: Oct. 9, 1996

Related U.S. Application Data

[62] Division of Ser. No. 551,906, Oct. 23, 1995, Pat. No. 5,628,896.

[30] Foreign Application Priority Data

Oct. 21, 1994 [DE] Germany .......................... 44 37 708.8

[51] Int. Cl.⁶ .................................................. B01D 37/04
[52] U.S. Cl. ........................... 210/739; 210/744; 210/86; 210/98; 210/103; 210/104; 210/105; 210/143; 210/169; 210/248; 210/416.2; 364/502; 4/508; 4/509
[58] Field of Search .................................... 210/739, 741, 210/744, 169, 416.2, 86, 98, 103, 104, 105, 143, 248; 364/502; 4/490, 492, 508, 509, 510

[56] References Cited

U.S. PATENT DOCUMENTS 4,676,914  6/1987  Mills et al. .............................. 210/169

FOREIGN PATENT DOCUMENTS 2645183  5/1977  Germany .
3730220  3/1989  Germany .

*Primary Examiner*—Robert Popovics
*Attorney, Agent, or Firm*—Karl Hormann

[57] ABSTRACT

A method of operating a filter system of a swimming pool in proportion to the degree of contamination of the water in said pool by processing a signal representative of the number of persons within the pool and other values characteristic of the pool and the filter system to derive a signal for controlling the output of said filter system.

4 Claims, 1 Drawing Sheet

COMPUTER CONTROLLED METHOD OF OPERATING A SWIMMING POOL FILTRATION SYSTEM

This is a divisional application pursuant to 37 C.F.R. 1.60 or application Ser. No. 08/551,906, filed Oct. 23, 1995, now U.S. Pat. No. 5,628,896.

BACKGROUND OF THE INVENTION b 1. Field of the Invention

The present invention relates generally to a novel method of operating a filter arrangement and, more particularly, to a method and apparatus of the kind capable of operating a filter arrangement as a function of contamination of, or particle suspension in, a fluid medium, such as, for instance, the water in a swimming pool. In this connection, the invention seeks to provide, while reducing electric energy consumption to between 30% and 60% of the energy used by conventional equipment, water of as good and constant a quality as regards hygienics or sanitation, safety and appearance as is obtained by the use of conventional systems. The teachings of the invention may be applied to existing equipment as well as to new pools.

2. The State of the Art

To comply with legal sanitation standards, public and private swimming pools are required to be equipped with controllable filter arrangements.

In some countries, such as Germany, treatment and disinfection of swimming pool water is governed by certain normative regulations, such as, for instance, DIN 19,643. Similar standards are mandated by law or regulation in other countries. The pool water is mechanically and chemically treated in a closed-loop system by being first removed and, following treatment, returned to the pool.

For this purpose, equipment is provided which ensures a constant quality of good water in a swimming pool which satisfies hygienic or sanitation standards, safety and appearance, to avoid human health hazards, as by spreading organisms causing diseases.

The filter arrangement is the major component and the main consumer of energy in such equipment; for not only does it provide for filtering of the water, but it also serves constantly to recirculate the water.

For such recirculation and filtering, electrically driven pumps are provided which are sized, for instance, pursuant to DIN 19,634 to accommodate the pipe and filter systems of the pool.

The requisite flow rate is determined on the basis of the applicable dimensions and other specifications, in dependence of the water surface of the pool;

the water surface per person;

the frequency at which the pool is used by each person;

the pollution caused by each person; and the type of pool.

In addition, the flow resistance of pipes and armatures;

the flow resistance of the filter; and the dynamic resistance of the filter as a result of its increasing congestion have to be taken into consideration.

Those parameters determine the dimensions of the filter set-up, and ideally they will have been determined or defined prior to the construction of the pool. Its components will then ensure the constancy of the flow rate mandated by DIN 19 643, for example, regardless of the number of persons using the pool, even though the number is a decisive factor in calculating the flow rate.

Filter arrangements equipped with two and more pumps offer the possibility of saving electrical energy by selectively shutting down one or more of the pumps. Such a system would, however, be subject to the subjective competency and discretion of personnel in charge of the pool and, therefore, requires increased attention.

Furthermore, methods and apparatus are known which are designed to satisfy norms or standards by appropriately recirculating pool water.

German published patent specification DE-OS 26 45 183 discloses an electric motor pump drive for a water recirculation system. The motor is equipped with two stator coils which, by selective energization, allow the motor to operate at two different speeds and, hence, outputs of the pump.

While other switching arrangements may conceivably be provided as well, the disclosed motor is switched between its different speeds by signals from a sensor measuring the degree of turbidity of the water. The sensor may be mounted in the pipe system of the filter or in the pool. Since the output of the pump—not counting zero output when the pump is idle—can only be set at two different levels, such a system is not adaptable to operate continuously as a function of dynamically changing water conditions.

The lower output is said to lead to a reduced noise level. Also, adjusting the output of the pump in accordance with the degree of turbidity of the water cannot lead to satisfactory results, in view of the fact that the sensor or probe for measuring the turbidity responds also to higher levels of contamination if it is mounted within the filter pipe system. This would lead to an undesirable excess of chemicals in the water.

Mounting it within the pool subjects the probe to the likelihood of damage, unless it is mounted in a recess or cavity. However, nothing is disclosed by the reference as regards a position for the mounting of the sensor. But even if the sensor were to be mounted in a cavity, the likelihood of excessive chemicals in the water remains.

German patent 3,730,220 discloses a method of detecting the degree of contamination of water while the pool is in use.

The method requires water to be taken from the pool at a predetermined location from below the water surface where usually the turbidity is highest, regardless of the effect of higher contamination levels.

The sensor directly transforms the degree of water turbidity into a proportional output signal on the basis of which the output of the pump is controlled and continually adjusted to prevalent conditions. The output of the pump is thus automatically adjusted in proportion to the turbidity of the water caused by contamination, so that at increased turbidity, for instance, the rate of recirculation flow of the water is increased to provide for quicker cleaning of the water.

The known methods and the apparatus for practicing them are all based upon preset parameters which determine and limit the efficacy and economy of these methods and their control components.

OBJECTS OF THE INVENTION

It is, therefore, an object of the invention to improve upon the prior art systems by providing a novel method of the practice thereof, for operating a filter arrangement of a swimming pool in proportion to the level of water contamination.

A more particular object resides in the continuous adjustment of the water recirculation flow rate in response to dynamic changes in the water contamination, by steplessly controlling the output of the filter arrangement and the pumps associated therewith.

It is also an object of the invention to control the recirculation of swimming pool water through a filter arrangement with simple means and at improved energy efficiency, without lowering the quality standards of prior art systems.

Yet another object of the invention is to provide a method of operating a swimming pool filter arrangement in proportion to the number of persons in the pool.

Other objects will in part be obvious and will in part appear hereinafter.

BRIEF SUMMARY OF THE INVENTION

In accordance with an advantageous embodiment, there is provided a novel method of operating a swimming pool filter arrangement including the steps of feeding first signals representative of at least one of loss of water, added fresh water, water spills, the pipe system, characteristic values of the pump and filter into a computer, determining the number of persons in the pool by measuring the water level in an overflow tank and deriving a second signal representative thereof, feeding said second signal to said computer for processing with said first signals to derive a control signal, feeding said control signal to a frequency converter to adjust the output of a filter pump to provide a flow rate in proportion to the number of persons determined.

In accordance with the invention, the method may be practiced by an apparatus comprising at least one sensor mounted within an overflow tank of a swimming pool and connected to a computer for processing signals generated by said sensor and connected to a frequency converter for controlling the output of a filter pump provided between a filter and said overflow tank.

Other objects will in part be obvious and will in part appear hereinafter.

BRIEF DESCRIPTION OF THE DRAWING

The novel features which are considered to be characteristic of the invention are set forth with particularity in the appended claims. The invention itself, however, in respect of its structure, construction, and lay-out, as well as manufacturing techniques, together with other objects and advantages thereof will be best understood from the ensuing description of the preferred embodiment, when read in conjunction with the appended sole drawing, which is a block diagram depicting the control of a filter arrangement.

In practicing the method of operating a swimming pool filter arrangement in accordance with the invention, the following factors are taken into consideration:

Figure 1:
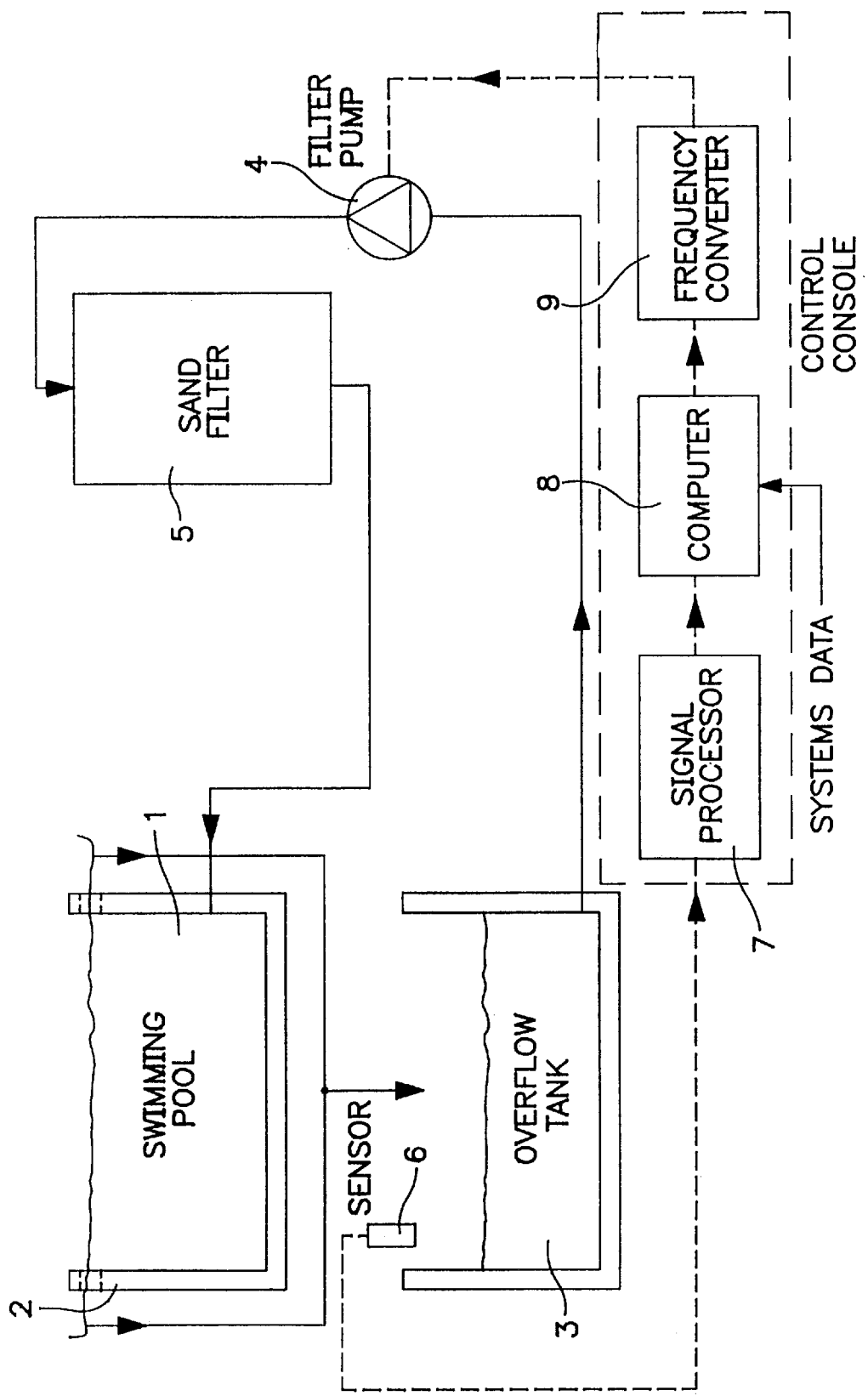

the loss of water;
the amount of added fresh water;
the spill water loss;
characteristic values of the pipe system;
characteristic values of the pump;
characteristic values of the filter.

Values representative of these factors are stored in the memory of a computer associated with the equipment for conversion into a control variable as will be described infra.

Based upon the factors to be set forth hereafter, the hourly rate of flow required to accommodate actual operating conditions may be defined as $$Q_{hreg} = R \times Q_{h100}$$

where $R = k/2 \times (1+H)$, and $Q_{hreg}$=the required (controlled) flow rate;

$Q_{h100}$=the uncontrolled (prior) flow rate;

R=reduction factor 0.5 . . . 1.0;

H=variable difference in an overflow tank water level 0.0 . . . 1.0;

$K = fK_1(t)$, $K_2$, $K_3$, $K_4$, $K_5$, $K_6$ (t), characteristic value of the system;

$K_1(t)$=water loss due to evaporation, splashing, removal;

$K_2$=added fresh water;

$K_3$=spilled water loss;

$K_4$=characteristic value of the pipe system;

$K_5$=characteristic value of the pump;

$K_6(t)$=characteristic value of the filter.

Assuming a minimum flow rate when no persons (reaction factor R=0.5) are using the pool, an increase in the number of persons in the pool will determine the increase in the reaction factor up to its maximum of 1.0, which corresponds to both a maximum number of bathers and a maximum flow rate.

In the regulating and controlling of the filter arrangement in accordance with the invention, the quantity of water contained within the entire filter network is assumed to be a constant which is circulated by a filter pump at a given rate of flow within a certain unit of time.

On average, every bather is known to displace from the pool a quantity of water of 75 $dm^3$. The displaced water flows into an overflow tank by way of overflow channels.

The quantity of water in the overflow tank increases by the quantity of water displaced by the bathers from the swimming pool. The resultant higher water level is measured and converted into a signal which is fed to a computer for processing. A control variable is derived from the processed signal and other values relevant to the system, and the control variable is used to control the output of each pump in a stepless manner.

The raised water level in the overflow tank results in an increased pump output and an increased rate of water flow per unit time. The increased flow rate may be calculated in accordance with the equation set forth supra. As the number of persons in the pool is lowered the water level in the overflow tank is lowered as well, so that the output of the pump may also be correspondingly reduced.

The appended drawing schematically depicts the elements and control apparatus required for practicing the method.

A swimming pool 1 is shown to be incorporated in a closed-loop circuit including an overflow channel 2 leading to an overflow tank 3. The overflow tank 3 is, in turn, connected to the swimming pool 1 by way of a filter pump 4 and a filter 5. Preferably, the pump 4 has a capacity sufficient to recirculate the entire water contents of the system within as short a time as mandated by health regulations. The filter 5 is shown to be a sand filter, but it will be understood by those skilled in the art that any other kind of filter may be utilized as well, or in addition to the sand filter 5. Moreover, the system may be augmented by dispensers (not shown) of any of the well-known water purification chemicals.

The overflow tank 3 is provided with at least one sensor 6 for measuring the water level within the overflow tank 3 at any given time and for continually providing signals representative of the level. The signals are fed to a signal processor 7, which may be of the kind well-known in the art, such as an analog to digital converter. The processed signal is fed to a computer 8 in the memory of which there are stored values characteristic of the entire system and its components as described supra. It will be apparent to persons skilled in the art that while the values stored in the memory may be representing static conditions adequate to provide sufficiently accurate average data, the values may also be continually updated to reflect dynamic changes in the conditions of the swimming pool and its filter arrangement. If the processed signal differs from a previously emitted one, the computer will calculate a new value and generate a corresponding control signal which is fed to a frequency converter 9. The frequency converter 9, in turn, emits to the filter pump 4 a signal for controlling the speed and, hence, the output volume thereof. It will be appreciated that filters may be provided between the signal processor 7 and the frequency converter 9 to suppress spurious signals or signals not sufficiently distinct from prior signals, to prevent the pump 4 from jerking excessively. As indicated by a dashed-line box 10, the control components 7, 8, and 9 are preferably mounted in a separate cabinet.

The method suggested herein leads to significant energy savings because of the 1:3 relationship between the flow rate and the consumption of electricity. Accordingly, if the flow rate is reduced by about 10% because of fewer persons in the pool, the energy required to drive the pump may be reduced by about 30%.

Practical experiments conducted with properly sized equipment have shown that in many swimming pools the energy savings may be as high as 60%.

The described invention thus provides for a method of operating a filter arrangement of a swimming pool in proportion to the use thereof. It allows to restrict the electrical energy required at any given time to the level of actual use of the pool, for instance, by sensors measuring the water level in an overflow tank to derive therefrom, and further process, a signal representative of the number of persons in the pool. The processes signal is used in conjunction with further system-related data to provide a variable control signal for adjusting the output in general and the number of rotations of a pump in particular, thereby to control the interrelationship between the electricity used by the pump and the rate of flow of water circulation. Preferably the control means is mounted in a compact control box.

When applied to controlling the operation of a filter arrangement of a swimming pool, the novel method draws upon actual conditions, comparing the flow rate calculated on the basis of DIN (legal standards) against the measured flow rate in the filter arrangement and providing the basic setting of the output of the pump on the basis of the comparison.

The electronic conversion of the relationship between the rate of flow and the requisite electrical energy is the decisive factor in the energy saved, that is to say, by reducing the rate of flow by about 10% the energy required to drive the pump can be reduced by about 30%.

The output of the pump may be adjusted in different ways or in response to different circumstances, such as, for instance, by electronically monitoring the number of persons admitted to the pool, either at the admissions counter or by light barriers, or, as hereinbefore described, in response to the water level in an overflow tank.

Another possibility of operating the filter arrangement in response to water conditions is by monitoring the degree of filter contamination and the amount of added fresh water, whereby the necessary data may be collected by differential measurements.

The quantity of fresh water admitted may be measured in response to the actual number of visitors to the pool, the evaporation and other factors contributing to the removal of water, and may be controlled in a manner depending upon the time of day.

An exact determination of the degree of filter contamination and the actually needed quantity of fresh water does not only result in saving energy but it also reduces water consumption, since the supply with fresh water is adjusted only in accordance with, or in response to, actual conditions.

What is claimed is:

1. A method of operating an arrangement of a filter including a pipe system and a feed pump of a swimming pool in proportion to the degree of contamination of water in said pool, comprising the steps of:

storing in a computer memory values representative of naturally occurring losses of said water (evaporation) per unit of time, of fresh water added, of water loss due to spillage, of said pipe system, and of the output of said feed pump and the flow resistance of said filter arrangement;

deriving a value a value indicative of the number of persons within said swimming pool;

processing said stored values and said indicative value to obtain a signal representative of said degree of water pollution; and feeding said pollution signal to means for controlling the output of said filter arrangement.

2. The method of claim 1, wherein said swimming pool is provided with an overflow tank adapted to receive water from said swimming pool to a predetermined level and wherein said indicative value is determined by measuring said level of water in said overflow tank.

3. The method of claim 2, wherein said feed pump is driven by a variable speed electric motor and wherein said output of said filter arrangement is controlled by controlling the speed of said motor.

4. The method of claim 3, wherein said means for controlling the output of said filter arrangement comprises a frequency converter connected to said electric motor and wherein said pollution signal is fed to said frequency converter for controlling the speed of said electric motor.

* * * * *